United States Patent
Matsumura et al.

(10) Patent No.: US 7,272,718 B1
(45) Date of Patent: Sep. 18, 2007

(54) DEVICE, METHOD AND STORAGE MEDIUM FOR SUPERIMPOSING FIRST AND SECOND WATERMARKING INFORMATION ON AN AUDIO SIGNAL BASED ON PSYCHOLOGICAL AUDITORY SENSE ANALYSIS

(75) Inventors: Yuuki Matsumura, Tokyo (JP); Hideo Sato, Tokyo (JP)

(73) Assignee: Sony Corporation (JP)

( * ) Notice: Subject to any disclaimer, the term of this patent is extended or adjusted under 35 U.S.C. 154(b) by 731 days.

(21) Appl. No.: 09/869,170

(22) PCT Filed: Oct. 27, 2000

(86) PCT No.: PCT/JP00/07593

§ 371 (c)(1),
(2), (4) Date: Jun. 25, 2001

(87) PCT Pub. No.: WO01/31629

PCT Pub. Date: May 3, 2001

(30) Foreign Application Priority Data

Oct. 29, 1999 (JP) .............................. P11-310324

(51) Int. Cl.
*H04L 9/00* (2006.01)
*H04N 7/167* (2006.01)
*H04K 1/00* (2006.01)
*G06F 17/30* (2006.01)
*G06F 7/04* (2006.01)
*G06K 9/00* (2006.01)

(52) U.S. Cl. .................... 713/176; 380/217; 380/232; 380/269; 726/32; 726/33

(58) Field of Classification Search ................ 713/176; 380/201, 217, 239, 269, 54; 726/32–33; 382/232
See application file for complete search history.

(56) References Cited

U.S. PATENT DOCUMENTS 6,031,914 A * 2/2000 Tewfik et al. .................. 380/54

(Continued)

FOREIGN PATENT DOCUMENTS

JP            11-232779         8/1999

(Continued)

OTHER PUBLICATIONS

Hartung, Frank et al. "Multimedia Watermarking Techniques", 1999.*

(Continued)

*Primary Examiner*—Kambiz Zand
*Assistant Examiner*—Michael J. Simitoski
(74) *Attorney, Agent, or Firm*—Lerner, David, Littenberg, Krumholz & Mentlik, LLP

(57) ABSTRACT

In a signal processing device and its method as well as a program storing medium, psychological auditory sense analysis of the survival state of an input signal of the time when the input signal has been compressed is performed in response to the compression processing, and the result of the very analysis is outputted as the psychological auditory sense encoded information, and digital watermarking information is superimposed on the input signal on the basis of the psychological auditory sense encoded information, so that it is possible to easily realize digital watermarking information that has large compression resistance and digital watermarking information that has small compression resistance.

12 Claims, 11 Drawing Sheets

U.S. PATENT DOCUMENTS

| | | | | |
|---|---|---|---|---|
| 6,061,793 | A * | 5/2000 | Tewfik et al. | 713/176 |
| 6,154,571 | A * | 11/2000 | Cox et al. | 382/250 |
| 6,272,634 | B1 * | 8/2001 | Tewfik et al. | 713/176 |
| 6,282,299 | B1 * | 8/2001 | Tewfik et al. | 382/100 |
| 6,332,194 | B1 * | 12/2001 | Bloom et al. | 713/176 |
| 6,493,457 | B1 * | 12/2002 | Quackenbush et al. | 382/100 |
| 6,591,365 | B1 * | 7/2003 | Cookson | 713/176 |
| 7,043,019 | B2 * | 5/2006 | Tehranchi et al. | 380/218 |
| 7,058,200 | B2 * | 6/2006 | Donescu et al. | 382/100 |
| 2001/0019618 | A1 * | 9/2001 | Rhoads | 382/100 |
| 2004/0059918 | A1 * | 3/2004 | Xu | 713/176 |

FOREIGN PATENT DOCUMENTS

WO    WO-00/72321    11/2000

OTHER PUBLICATIONS

Kaewkamnerd, N. et al. "Wavelet based image adaptive watermarking Scheme", 2000.*

Kundur, Deepa et al. "Towards a Telltale Watermarking Technique for Tamper-Proofing". ICIP (2), 1998: 409-413.*

Kwok, S.H. et al. "Watermark Design Pattern for Intellectual Property Protection in Electronic Commerce Applications", 2000 IEEE.*

Lacy, Jack et al. "Intellectual property protection systems and digital watermarking", Dec. 1998.*

Lacy, Jack et al. "On Combining Watermarking with Perceptual Coding ", 1998.*

Swamson, Mitchell D. et al. "Robust Audio Watermarking Using Perceptual Masking", May 1998.*

Swamson, Mitchell D. et al. "Multiresolution Video Watermarking Using Perceptual Models and Scene Seqmentation". ICIP (2), 1997.*

Signal Processing 66 (1998) pp. 337-355, Mitchell D. Swanson, Bin Zhu, Ahmed H. Tewfik, Laurence Boney "Robust audio watermarking using perceptual masking".

Mintzer, F. et al: "If One Watermark is Good, Are More Better?" 1999 IEEE International Conference on Acoustics, Speech, and Signal Processing. Phoenix, AZ, Mar. 15-19, 1999, IEEE International Conference on Acoustics, Speech, and Signal Processing (ICASSP), New York, NY : IEEE, US, vol. vol. 4, Mar. 1999, pp. 2067-2069.

Fridrich, J: "Hybrid Watermark for Tamper Detection in Digital Images", International Symposium on Signal Processing and Its Applications. Proceedings, vol. 1, Aug, 22, 1999, pp. 301-304.

* cited by examiner

| ROBUST WATERMARK | FRAGILE WATERMARK | APPLICATION |
|---|---|---|
| ○ | ○ | COPYING IS PERMITTED |
| ○ | × | COPYING IS NOT PERMITTED |
| × | ○ | EXCEPTION |
| × | × | COPYING IS PERMITTED |

6: WATERMARK DECODER

DEVICE, METHOD AND STORAGE MEDIUM FOR SUPERIMPOSING FIRST AND SECOND WATERMARKING INFORMATION ON AN AUDIO SIGNAL BASED ON PSYCHOLOGICAL AUDITORY SENSE ANALYSIS

TECHNICAL FIELD

This invention is directed to a signal processing device and its method as well as a program storing medium, and suitably applicable to the safeguarding of the copyright of music data and so on.

BACKGROUND ART

In recent years, music contents and so on have been distributed to an indefinite number of network terminal devices (computers) from a Web site via a network such as the Internet.

A computer user is able to record the distributed music contents on a wide variety of recording media in a state of digital data, so as to generate a music soft of favorite music that is recorded with a satisfactory tone quality, as the user wishes.

In this way, a computer user has accessed a Web site and recorded music contents on a recording medium freely. However, the act of distributing music contents by the person who set up the Web site without permission of the copyrighter, who is the owner of the music contents, will cause a problem of an infringement of the copyright of the music contents.

DISCLOSURE OF INVENTION

Considering aforementioned respects, this invention proposes a signal processing device and its method as well as a program storing medium that can effectively suppress the infringement of the copyright of contents that have been distributed to an indefinite number of terminal devices via, for instance, a network.

In order to solve such a problem, in the present invention, psychological auditory sense analysis of the survival state of an input signal of the time when the input signal has been compressed is performed in response to the compression processing, and the result of the very analysis is outputted as the psychological auditory sense encoded information, and digital watermarking information is superimposed on the input signal on the basis of the psychological auditory sense encoded information, so that it is possible to easily generate digital watermarking information that has large compression resistance and digital watermarking information that has small compression resistance.

BEST MODE FOR CARRYING OUT THE INVENTION

An embodiment of the present invention will be described in detail hereinafter with reference to the drawings.

Figure 1:
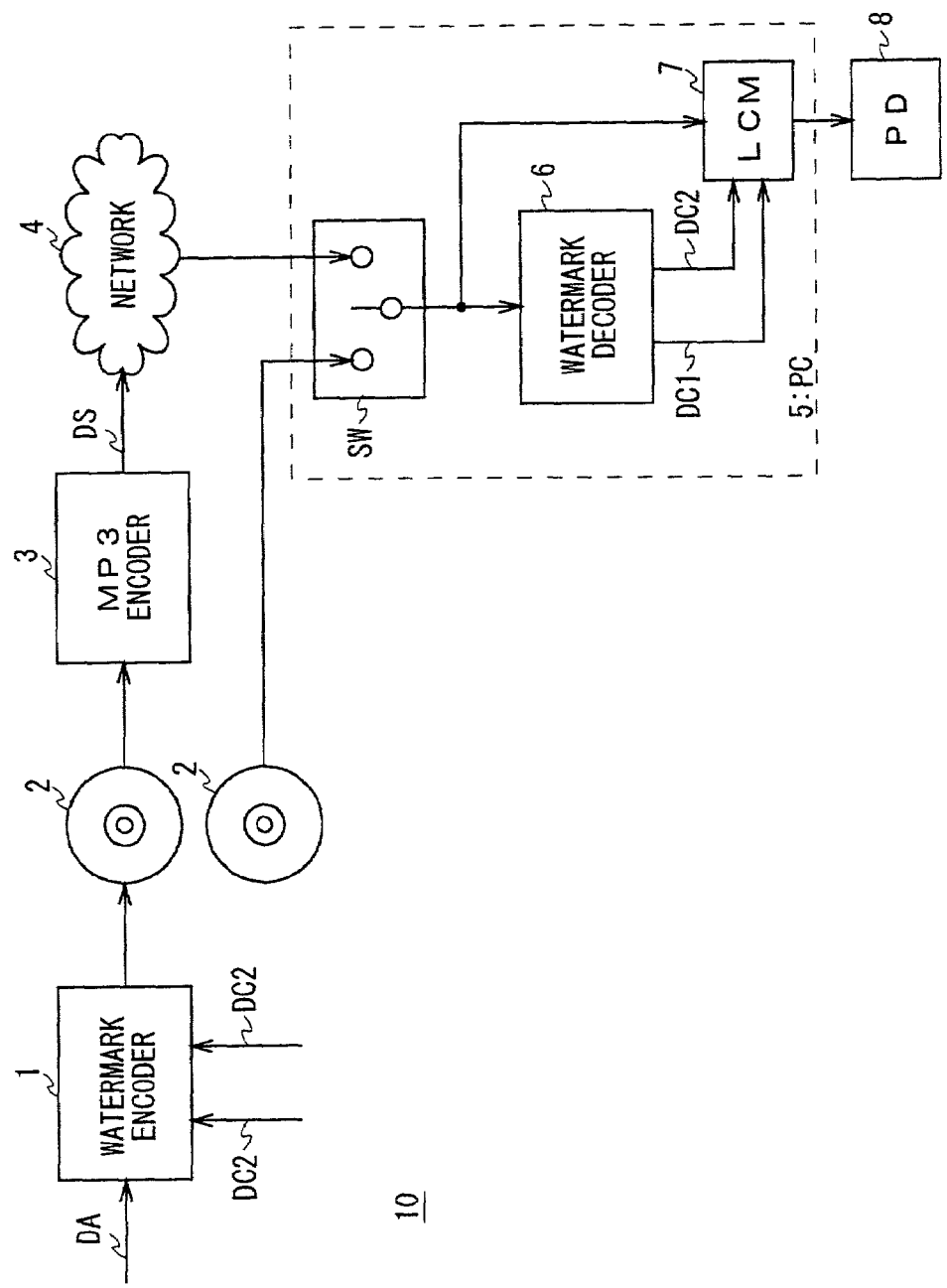
FIG. 1 is a block diagram illustrating a general configuration of a copy control system in which a watermark is utilized according to the present invention.

In FIG. 1, 10 shows a contents copy control system as a whole; at the time when it records a digital audio signal DA, which is the audio source, on an optical disk 2, it adds a robust (strong) watermark DC1 and a fragile (weak) watermark DC2 to the digital audio signal DA and then records them on the optical disk 2, by means of a watermark (digital watermarking information) encoder 1.

At here, the robust watermark DC1 is comprised of information of the audio source, such as the name of the copyright holder, and whether the copying is permitted or not; the fragile watermark DC2 is comprised of information such as a trigger for detecting the compression history. In this connection, the robust watermark DC1 is a watermark that does not vanish even if it has passed through a compressing system of MP3 and so on, and the fragile watermark DC2 is a watermark that vanishes (the survival rate becomes low) when it has passed through a compressing system of MP3 and so on, because of its quantization error.

In this way, in the case where a compressed stream signal DS, which has been uploaded to a site on a network 4 via a compression processing by, for instance, a MP3 (MPEG Audio Layer 3) encoder 3 and so on, out of optical disks 2 on which the digital audio signal DA including the robust watermark DC1 and the fragile watermark DC2 has been recorded, is downloaded to a personal computer 5, and also in the case where an optical disk 2 that is distributed without being compressed, out of optical disks 2 on which the digital audio signal DA including the robust watermark DC1 and the fragile watermark DC2 has been recorded, is loaded to the personal computer 5, the personal computer 5 first judges based on a signal that is input to a Codec (Code and Decode) comprising a modem (Modulator Demodulator) whether the input signal to the personal computer 5 is the non-compressed digital audio signal DA or the compressed stream signal DS, and by what compression standard the compressed stream signal DS has been encoded and then selectively switches a switch SW according to the judgement result.

And, the personal computer 5 detects the embedded copyright information out of the input signal of the personal computer 5 by means of a watermark decoder 6, and controls copying of the input signal (the digital audio signal DA, the compressed stream signal DS and so on) to a PD (portable device) 8 such as a memory card. That is, the watermark decoder 6 detects the robust watermark DC1 and the fragile watermark DC2. A LCM (licensed SDMI (secure digital music initiative) compliant module) 7 controls whether the music contents are copied to the PD 8 or not, on the basis of two kinds of watermarks (the robust watermark DC1 and the fragile watermark DC2) that have been detected by the watermark decoder 6.

Figures 2, 10:
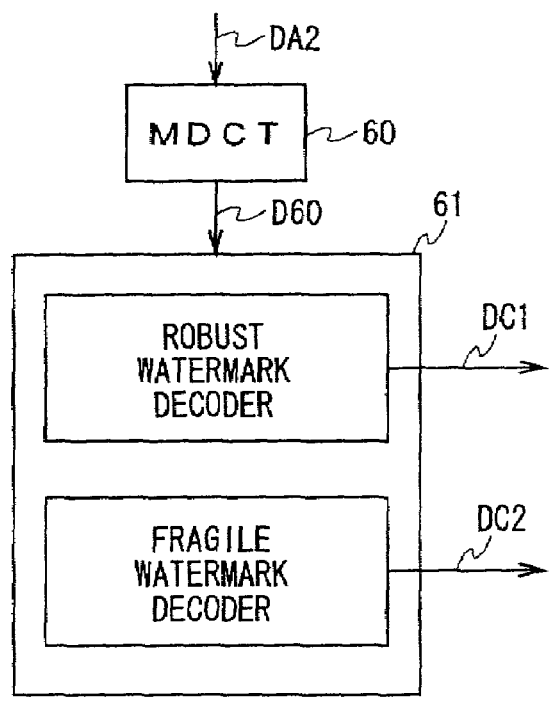
FIG. 2 is a schematic diagram showing an example of application of the copy controlling in the copy control system.
FIG. 10 is a block diagram illustrating a configuration of the watermark decoder.

FIG. 2 shows an example of controlling of whether the music contents are copied to the PD 8 or not, which is performed by the LCM 7, using the detected two kinds of watermarks; in the case where the robust watermark DC1 has been detected and the fragile watermark DC2 has not been detected, the LCM 7 determines that the music contents have some compression histories, and inhibits the PD 8 from copying the very music contents.

In the case where both the robust watermark DC1 and the fragile watermark DC2 are detected, the LCM 7 determines that no compression history could be found and permits copying of the very music contents to the PD 8.

Furthermore, in the case where both the robust watermark DC1 and the fragile watermark DC2 are not detected, the LCM 7 permits copying of the very music contents to the PD 8 because of no information as to the copyrighter of the music content or permission of copying. There is no technical possibility of a case where the robust watermark DC1 is not detected and the fragile watermark DC2 is either detected, which is thus exceptional.

Figure 3:
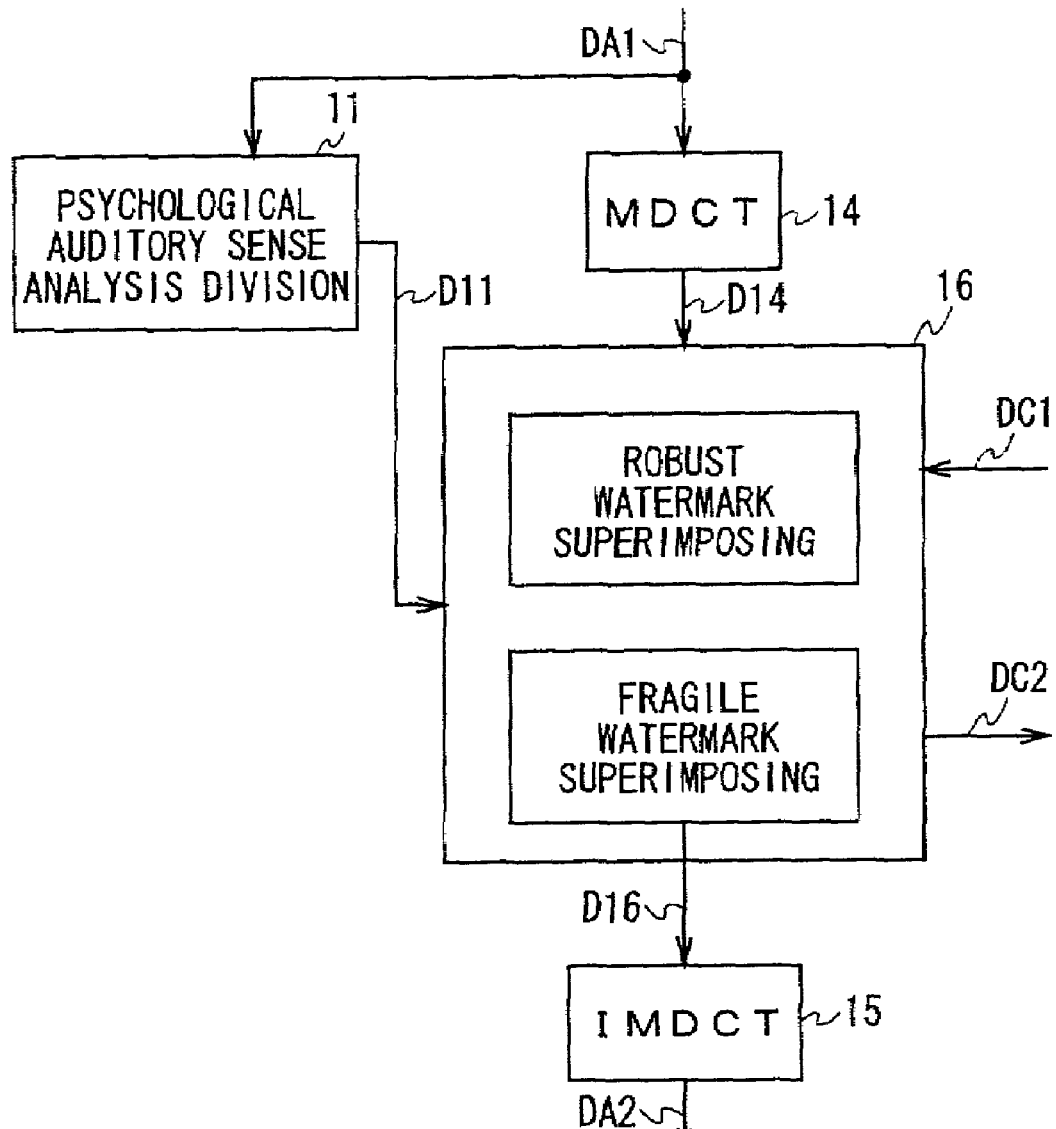
FIG. 3 is a block diagram illustrating a configuration of the watermark encoder according to an embodiment of the present invention.

FIG. 3 shows a configuration of the watermark encoder 1; a psychological auditory sense analysis division 11 performs the analysis of the sequentially inputted digital audio signal DA1, utilizing a psychological auditory sense model, and controls a watermark superimposing division 16 that has a robust watermark superimposing division and a fragile watermark superimposing division. The digital audio signal DA1 generates a MDCT coefficient D14 at a MDCT (modified discrete cosine transform) processing division 14, and then outputs this to the watermark superimposing process division 16.

The watermark superimposing division 16 is adapted to respectively superimposing the robust watermark DC1 and the fragile watermark DC2 on a spectrum of the frequency band that has been determined on the basis of the analysis result of the psychological auditory sense analysis division 11 mentioned below, out of a frequency spectrum of time series sample blocks of the digital audio signal DA1 that has been MDCT converted.

Figure 4:
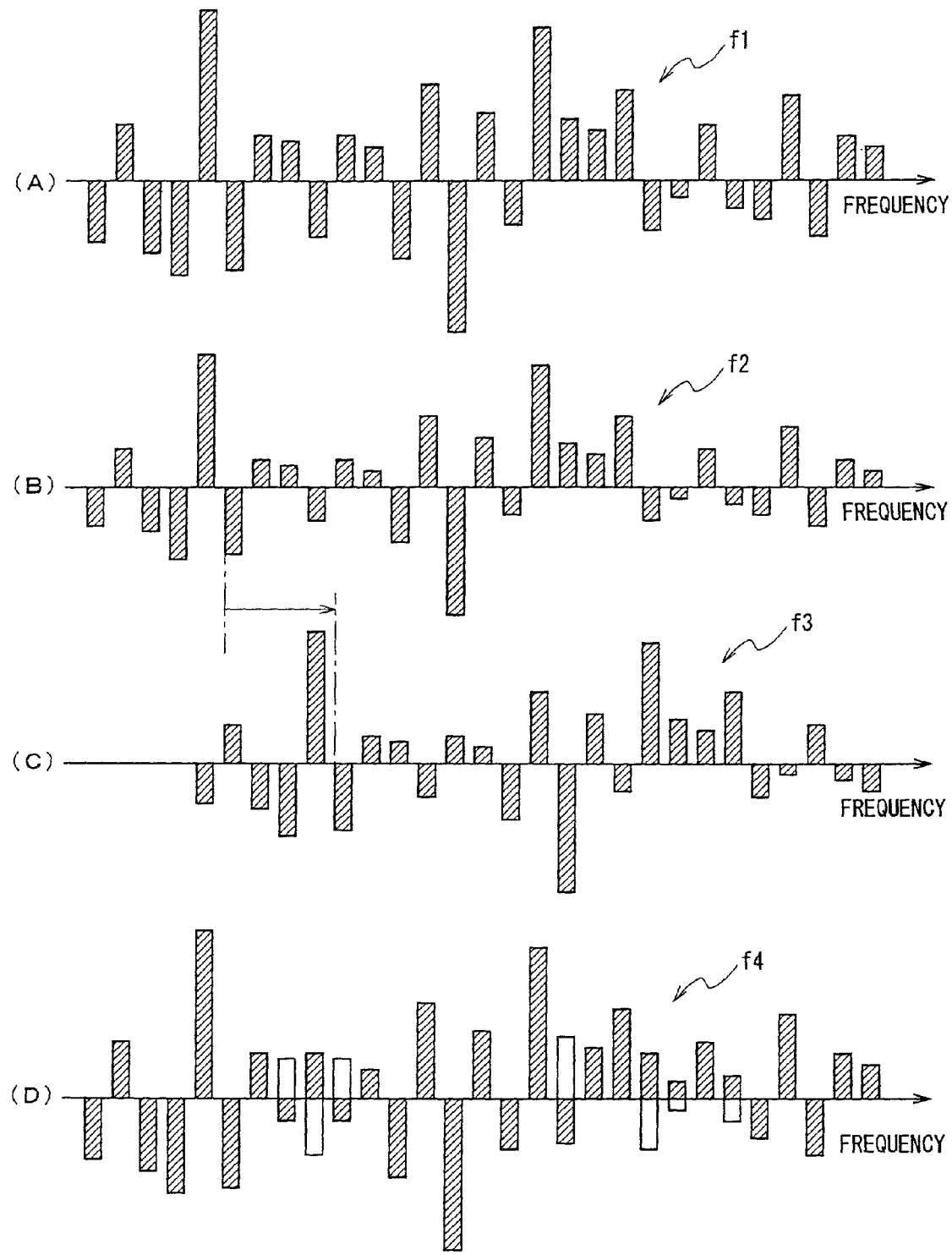
FIG. 4 is a schematic diagram used for explaining the principle of superimposing a watermark.

More concretely, the watermark superimposing division 16 extracts a spectrum of the frequency band f1 on which to superimpose the robust watermark DC1 and the fragile watermark DC2, out of the frequency spectrum of time series sample blocks of the input audio signal DA1 that has been MDCT converted (FIG. 4 (A)).

The watermark superimposing division 16 then scales the frequency spectrum f1 at a stated rate, and generates a frequency spectrum f2 that is attenuated (FIG. 4(B)). If the polarity of data to be embedded is "1", the frequency spectrum f2 is used as it is. If the polarity of data to be embedded is "0", the frequency spectrum f2 with the positive and negative inverted is used.

The watermark superimposing division 16 shifts the frequency spectrum f2 in the direction of higher or lower frequency to keep a distance for four bars of spectrum (FIG. 4(C)). In FIG. 4C, the frequency spectrum f2 is shifted for four bars of spectrum in the direction of higher frequency to generate a frequency spectrum f3.

Next, the watermark superimposing division 16 superimposes the robust watermark DC1 and the fragile watermark DC2 on a frequency spectrum f4 (FIG. 4 (D)), which has been obtained by adding the shifted frequency spectrum f3 (FIG. 4 (C)) to the original frequency spectrum f1 (FIG. 4(A)).

At the point of addition, the correlation between the polarities of a certain frequency spectrum and a frequency spectrum that is away by four bars is processed to be inclined to the positive or negative. This processing is performed only when the sign of the frequency spectrum f4 is inverted by adding the frequency spectrum f3 to the frequency spectrum f1, but not performed at other times when the sign is not inverted. In FIG. 4(D), blank frames represent signal elements eliminated from the frequency spectrum f1 (FIG. 4(A)) and hatching frames represent signal elements obtained from the addition.

This can reduce the amount of embedded watermarks which causes deterioration of tone quality and does not contribute to the accuracy of detection. Moreover, by scaling the original frequency spectrum and adding it to its adjacency, embedding with reduced deterioration of tone quality will be possible using the masking effect.

In this connection, if it adds the level that has been obtained by attenuating the level of the first frequency component f1 (FIG. 4(A)) in which the watermark is to be embedded in a definite rate and that the polarity of the watermark to be embedded is multiplied, to the level of the second frequency component f3 (FIG. 4(C)) that is away from the first frequency component f2 (FIG. 4(B)) by, for example, 4 frequency components, and embeds the watermark, then, after the watermark has been embedded, such a probability is heightened that the polarity of the correlation between the first frequency component f1 (FIG. 4(A)) and the level of the second frequency component f3 (FIG. 4(C)) becomes the same (positive or negative), and this is utilized for detection of the watermark in a watermark decoder that will be mentioned below.

In this way, on the basis of the result D11 of the analysis performed in the psychological auditory sense analysis division 11, the watermark superimposing process division 16 embeds the robust watermark DC1 and the fragile watermark DC2, so as to become the frequency band and the sound pressure level that include the consideration for the threshold of audibility and/or the masking threshold effect mentioned below, in the previously and separately allocated plural frequency bands, respectively.

That is, the psychological auditory sense analysis division 11 analyzes the input digital audio signal DA1, and calculates from curves of original sound and threshold of audibility a masking threshold which is the limit to being able to perceive actually listening to the original sound. The masking capability toward the given digital audio signal DA1 depends on the frequency band and the level of sound pressure.

Generally speaking, in an encoder for compression processing, on the basis of the information of the frequency band and the level of sound pressure, the best method for representing the input audio signal with the restricted bit resolution would be determined. That is, by utilizing a psychological auditory sense model that is used for compression, and embedding the watermark with a position and an energy of the frequency that tends to be eliminated by the compression process, it is possible to realize the fragile watermark DC2.

Hereinafter, the principle of the method for embedding the robust watermark DC1, which is resistant to compression, and the fragile watermark DC2, which is easily affected by compression, utilizing the frequency band that tends to be eliminated by compression process is explained.

Figure 5:
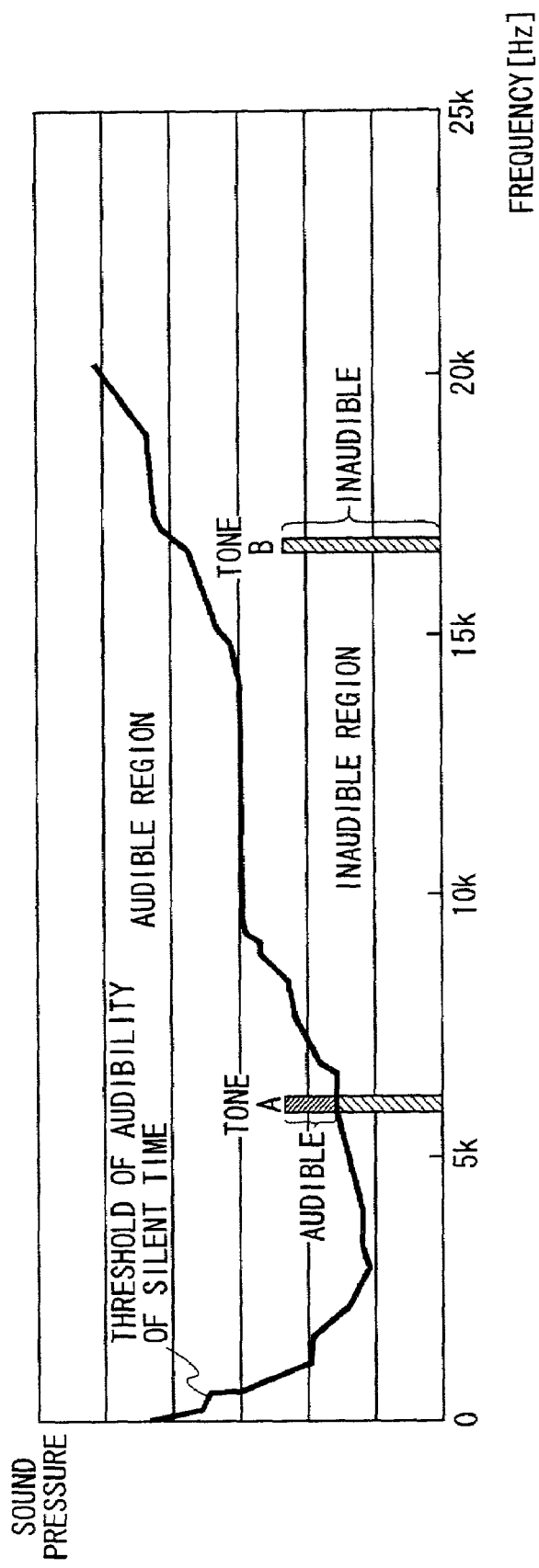
FIG. 5 is a schematic diagram used for explaining the processing of the psychological auditory sense analysis division.

FIG. 5 shows a threshold of audibility; a threshold of audibility of silent time means the minimum level of sound that can be detected by the auditory sense, and relates to a boundary of a noise that can be perceived by the auditory sense at a silent time. As shown in FIG. 5, a sound whose sound pressure level is higher than the threshold of audibility of silent time like the tone A can be perceived, but a sound whose sound pressure level is lower than the threshold of audibility of silent time like the tone B can not be perceived. Moreover, as shown in FIG. 5, a threshold of audibility of silent time depends on frequency, and even if the tones A and B have the same sound pressure level, they can be perceived or not depending upon the frequency of the sound.

Figure 6:
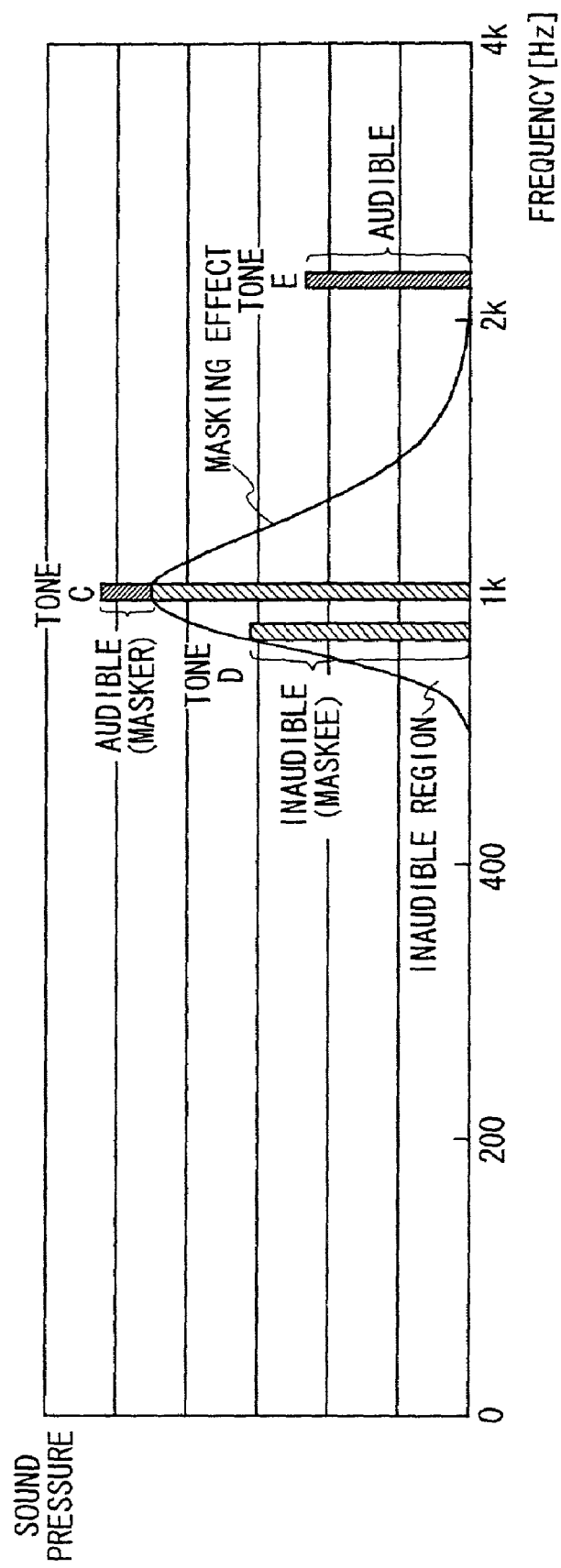
FIG. 6 is a schematic diagram used for explaining the processing of the psychological auditory sense analysis division.

And, FIG. 6 shows a masking effect; a masking effect mainly relates to the detection threshold of quantization distortion and/or background noise, and the detection threshold of the specific sound greatly varies depending on the other sounds that are heard at the same time. As shown in FIG. 6, as to a definite frequency range concerning the tone C, the other sounds become difficult to be perceived; for instance, the tone D is almost inaudible in spite of the fact that it is a pure tone that has comparatively high sound pressure, on the other hand, the tone E is audible. The nearer the frequency of the masker (a sound that masks the other) and the frequency of the maskee (a sound that is masked and made inaudible) are positioned, the stronger the masking effect operates.

Therefore, in the watermark encoder 1, utilizing these principles, the process of embedding the watermarks (the robust watermark DC1 and the fragile watermark DC2) is achieved wherein the compression characteristics of MP3 is considered.

Figure 7:
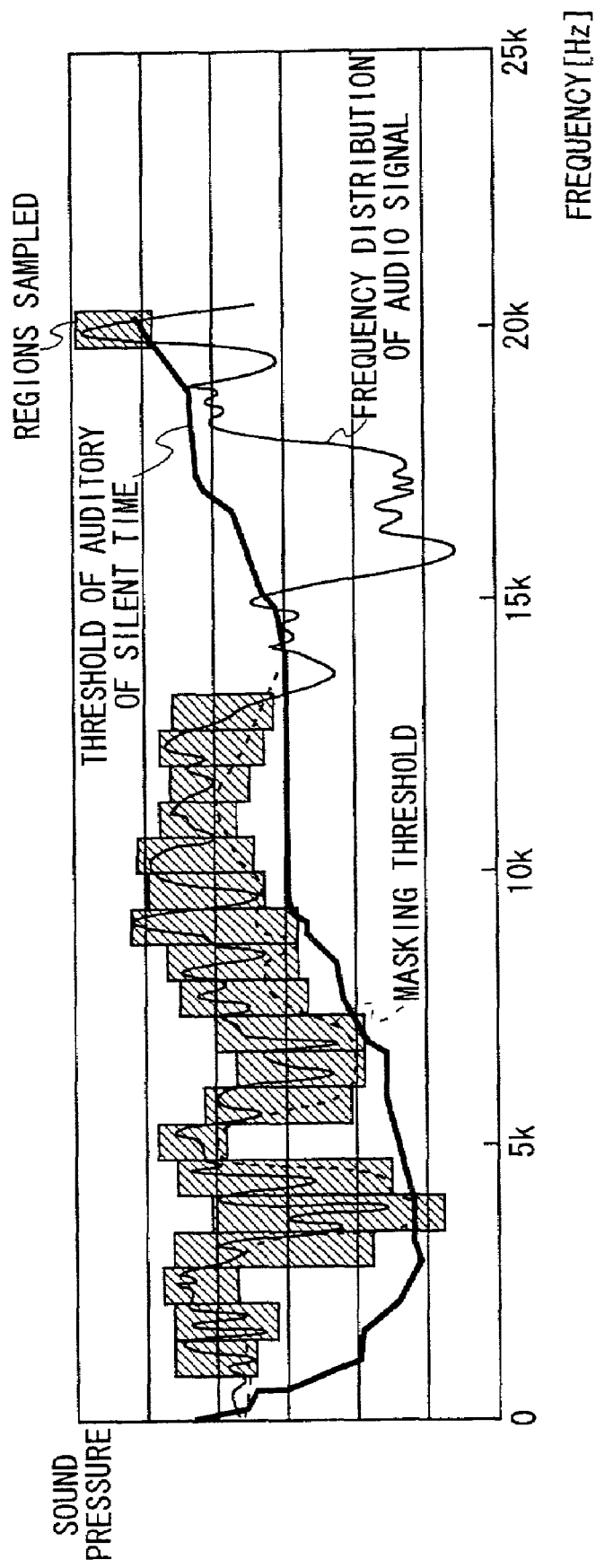
FIG. 7 is a schematic diagram used for explaining the psychological auditory sense encoding.

In this connection, FIG. 7 shows encoding (psychological auditory sense encoding in which psychological auditory sense is considered) performed in a MP3 encoder 3 (FIG. 1); for instance, after the MP3 encoder 3 has divided the input audio signal DA into 32 frequency bands (subbands), it performs psychological auditory sense encoding in such a manner that the quantization noise falls under the threshold of audibility. The solid line in FIG. 7 represents a frequency distribution of the audio signal DA, and the bold line represents the threshold of audibility of silent time.

In psychological auditory sense encoding, in the first place, from the curves of the original sound and the threshold of audibility, the masking threshold (the broken line in FIG. 7) that is the boundary which can be perceived during the original sound is actually heard is calculated. Next, for each subband, the quantization step of each subband is allocated, in such a manner that the quantization noise becomes the smaller level than the masking threshold.

In FIG. 7, the ranges that are sampled by the compression processing are shown with the rectangle areas, and the bases of the rectangles correspond to the quantization noise levels. In such a region that the original sound is smaller than the masking threshold, the original sound is inaudible, and so it can be eliminated from the sample; on the other hand, in such a region that the sensitivity of auditory sense is high and the masking do not work sufficiently, the quantization steps are made fine, and the level of the quantization noise is lowered hereby.

Therefore, the psychological auditory sense analysis division 11 of the watermark encoder 1 analyzes the digital audio signal DA1 based on the characteristics of psychological auditory sense encoding of the MP3 encoder 3 with respect to the inputted digital audio signal DA1, and, on the basis of the result of the very analysis, calculates the frequency band and its sound pressure in which the robust watermark DC1 and the fragile watermark DC2 are to be embedded, and controls the watermark superimposing division 16 by the result of the very calculation (the psychological auditory sense encoded information D11).

Figure 8:
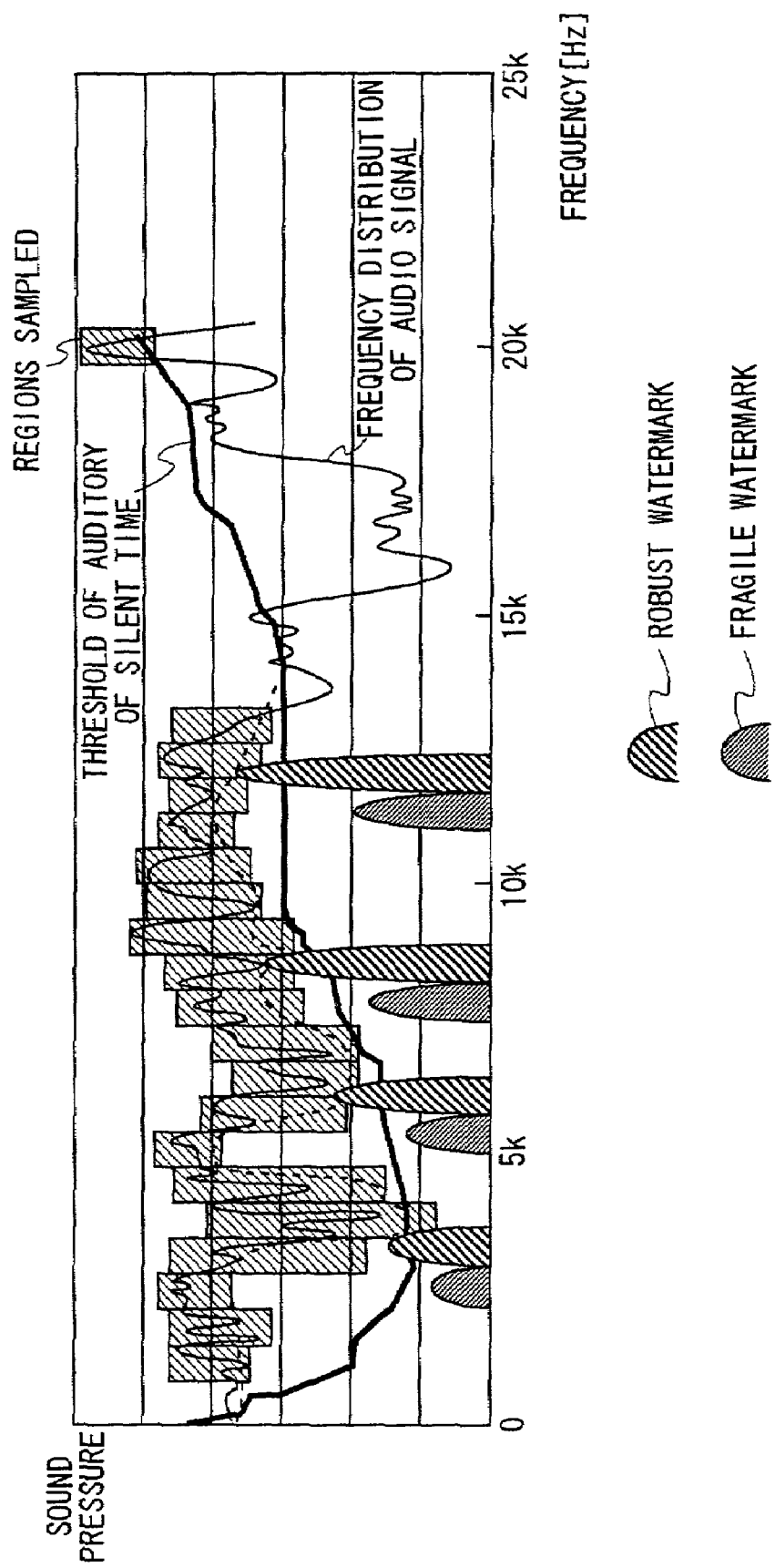
FIG. 8 is a schematic diagram showing an example of encoding of the watermarks according to the present invention.

As a result of this, as shown in FIG. 8, by embedding a watermark in a rectangular region, which is sampled in compression processing, the very watermark would function as the robust watermark DC1 that is resistant to compression, and if a watermark has been embedded in the outside of a rectangular region, which is eliminated through compression processing, the very watermark would function as the fragile watermark DC2 that is easily affected by compression.

On the basis of the psychological auditory sense encoded information D11 that has been calculated by the psychological auditory sense analysis division 11, the watermark superimposing division 16 embeds the robust watermark DC1 and the fragile watermark DC2 in the digital audio signal DA1.

In this connection, the region in which the watermark is embedded is not limited to a frequency region, but may be a time region.

Then, a MDCT coefficient D16, which is outputted from the watermark superimposing division 16, is exposed to inverse orthogonal transformation in an IMDCT processing division 15, in this way it is outputted as the digital audio signal DA2 that is having the same form as the form of the original digital audio signal DA1 and that the robust watermark DC1 and the fragile watermark DC2 have been embedded in.

In this embodiment, the digital audio signal DA2 is encoded by the stated encoder (not shown), and used to expose an original master of a disk, and then an optical disk 2 is produced in volume on the basis of this original master disk.

Figure 9:
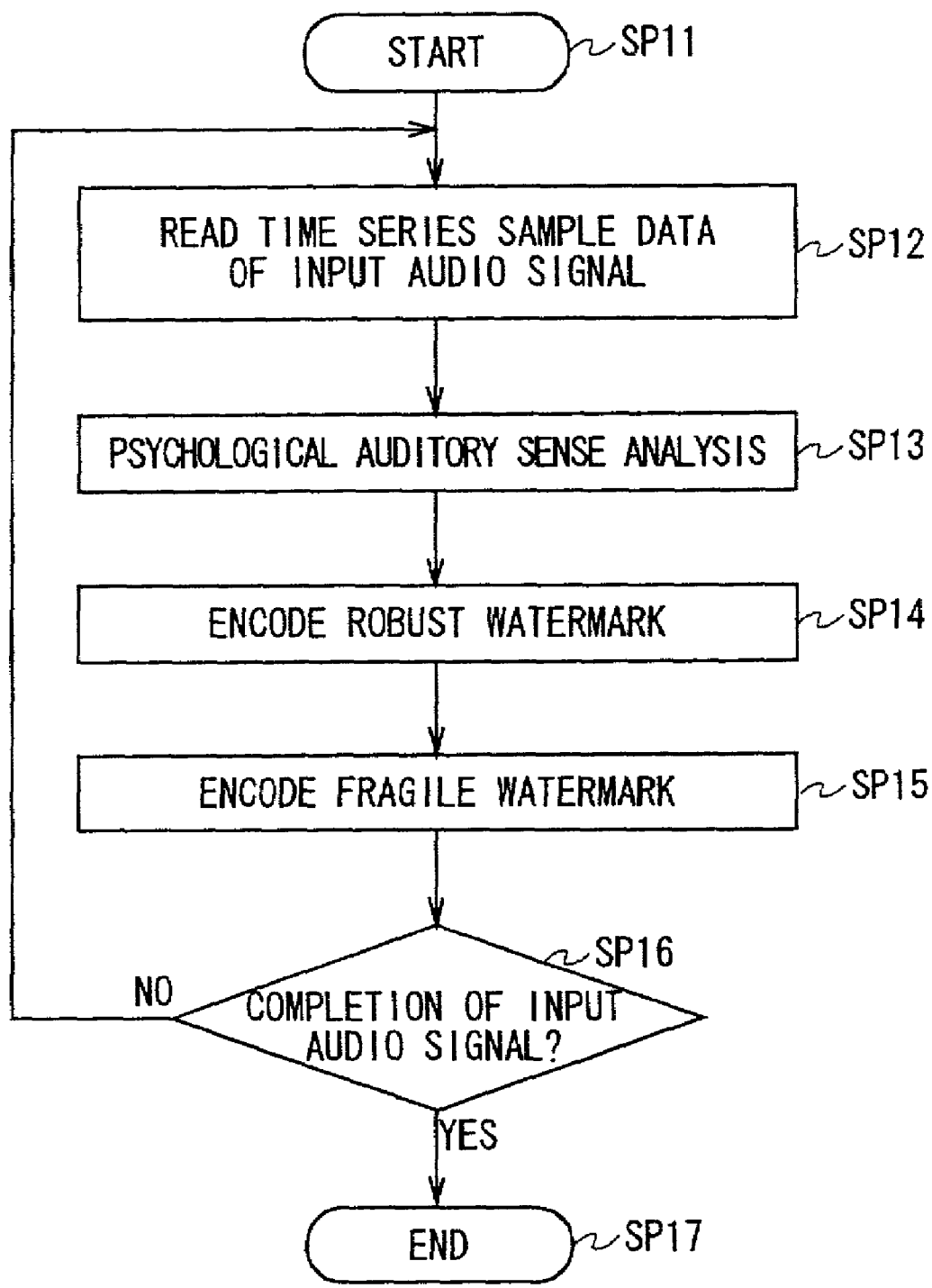
FIG. 9 is a flow chart showing a procedure of the watermark encoder.

FIG. 9 shows a procedure of the watermark encoder 1, which processes the digital audio signal DA1; the watermark encoder 1 moves from the step SP11 to the step SP12, and sequentially reads the digital audio signal DA1 for each sample block. Then, the watermark encoder 1 goes to the step SP13, and analyzes the digital audio signal DA1, and extracts the psychological auditory sense encoded information D11 from the digital audio signal DA1.

Then, on the following step SP14, the watermark encoder 1 embeds the robust watermark DC1 in the digital audio signal DA1, on the basis of the psychological auditory sense encoded information D11; in addition, on the step SP15, it embeds the fragile watermark DC2 in the digital audio signal DA1, on the basis of the psychological auditory sense encoded information D11.

In this way, the watermark encoder 1 obtains the digital audio signal DA2 that is having the same form as the form of the inputted digital audio signal DA1 and that the robust watermark DC1 and the fragile watermark DC2 have been embedded in.

The watermark encoder 1 then goes to the step SP16, and judges whether the processing of the digital audio signal DA1 has been completed or not; when the negative result has been obtained here, it returns to the step SP12. In this way, the watermark encoder 1 repeats this procedure for each sample block in sequence, so as to process the digital audio signal DA1; when the affirmative result has been obtained on the step SP16, it moves from the step SP16 to the step SP17, and ends the very procedure.

FIG. 10 shows a configuration of the watermark decoder 6 of the personal computer 5, which has been stated above with reference to FIG. 1; the watermark decoder 6 detects the robust watermark DC1 and the fragile watermark DC2 from the digital audio signal DA2, which is obtained by a playback of the optical disk 2 (FIG. 1).

That is, the watermark decoder 6 performs MDCT processing of the sequentially inputted digital audio signal DA2 in a MDCT processing division 60, and obtains a MDCT coefficient D60 hereby, and then outputs this to the watermark detecting division 61.

With respect to the inputted MDCT coefficient D60, the watermark detecting division 61 shifts each of plural frequency components that have been previously and separately allocated to the robust watermark DC1 and the fragile watermark DC2 as their embedding frequency bands by, for instance, 4 frequency components in such a direction that the frequencies increase; on the basis of the new MDCT coefficient that has been obtained by the very shifting process and the MDCT coefficient D60 that is obtained from the MDCT processing division 60, it compares the polarities of the frequency components, and detects the robust watermark DC1 and the fragile watermark DC2 on the basis the lean of the polarity.

In this connection, the region in which the watermark is detected is not limited to a frequency region, but may be a time region.

When only the robust watermark DC1 has been detected at the time of copying of the digital audio signal DA2 that has been recorded on the optical disk 2, this is representing that there is a history of compression based on MP3, that is, the digital audio signal DA2 in which the robust watermark DC1 that has been detected at this time has been embedded is the contents that has been distributed via the network 4; so, when copying restriction is previously set by the copyrighter, by restricting the copying, it is possible to prevent illegal copying that constitutes an infringement of the copyright.

Besides, when both of the robust watermark DC1 and the fragile watermark DC2 have been detected, this is representing that there is not any history of compression based on MP3, that is, it is not what has been distributed via the network 4, and that the copyrighter releases it free of charge; so, it can be known that the copying restriction is needless.

Thus, in the personal computer 5, it is possible to restrict the copying, on the basis of the copyright information and the compression history information based on the robust watermark DC1 and the fragile watermark DC2.

Figure 11:
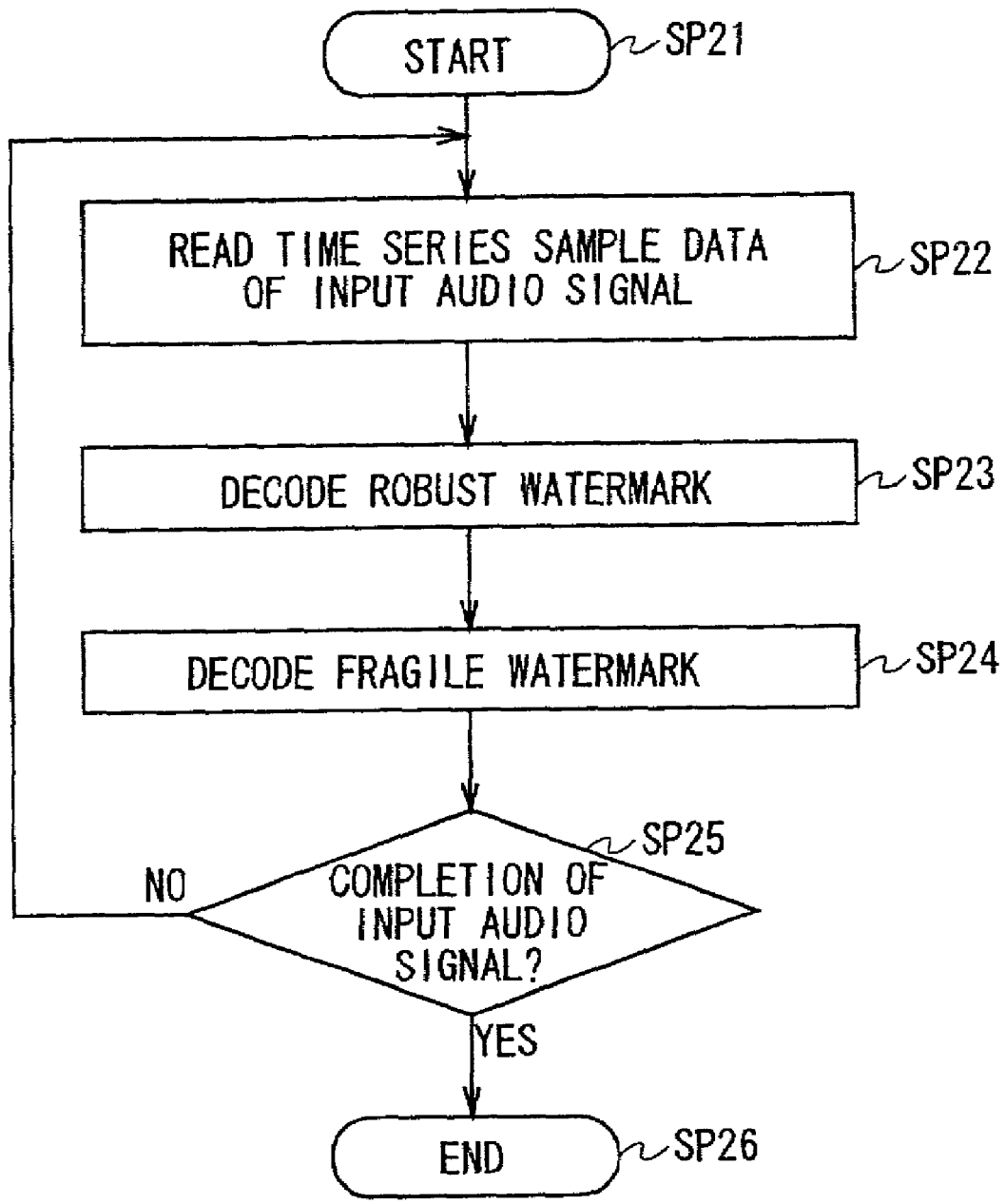
FIG. 11 is a flow chart showing a procedure of the watermark decoder.

FIG. 11 shows procedure of the watermark decoder 6 for processing the digital audio signal DA2; the watermark decoder 6 enters the very procedure at the step SP21 and goes to the step SP22, and reads the digital audio signal DA2 in sequence for every sample block. Then, the watermark decoder 6 goes to the step SP23 and detects the robust watermark DC1 from the digital audio signal DA2, and detects the fragile watermark DC2 at the following step S P24.

After the detection of the fragile watermark DC2, the watermark decoder 6 goes to the step SP25 and judges whether the processing of the digital audio signal DA2 has been completed or not; when the negative result has been obtained, it returns to the step SP22. In this way, the watermark decoder 6 repeats this procedure in sequence for each sample block, so as to process the digital audio signal DA2; when the affirmative result has been obtained at the step SP25, it goes to the step SP26 and ends the very procedure.

In the above configuration, the psychological auditory sense analysis division 11 of the watermark encoder 1 determines the embedding position (for instance, frequency band) and the sound pressure level, in response to the compression characteristics of the MP3 encoder 3 (psychological auditory sense models of threshold of audibility, masking effect and so on that have been adopted in the various compression standards), so that it is possible to embed the fragile watermark DC2 that is easily affected by compression and that meets the compression characteristics of the MP3 encoder 3 in the digital audio signal DA1.

Therefore, when the fragile watermark DC2 has been compressed via the MP3 encoder 3, its survival rate would be lowered sufficiently, and it would not be detected at the watermark decoder 6.

In this way, according to the above configuration, it is possible to easily realize the robust watermark DC1 that is resistant to compression and the fragile watermark DC2 that is affected by compression. In this connection, by embedding copyright information in the robust watermark DC1, which has strong compression resistance, it is possible to render the copyright information difficult to be detected on the basis of the robust watermark DC1 that has been detected after it has passed through the compression system. Moreover, the compression history can be determined on the basis of the reduction or elimination of the fragile watermark DC2 after it has passed through the compression system so that the illegal copying on the network can be prevented.

In the above embodiment, such a case has been described that the robust watermark DC1 and the fragile watermark DC2 are detected from the digital audio signal that is obtained by a playback of the optical disk 2; however, we do not intend to limit the present invention to such. The present invention is applicable to also such a case that the watermark is detected from a stream signal in which the digital audio signal has been compress-processed. If do it like this, it is possible to eliminate trouble of extending the compressed stream signal and transforming it to the same form as that of the original digital audio signal, and it is possible to enhance the speed of the processing.

When embedding the robust watermark DC1 and the fragile watermark DC2 in the digital audio signal, the fragile watermark DC2 may be embedded in a form that it may not be deleted by predetermined compression processing.

In this case, the fragile watermark DC2 may be embedded in a form that it may not be deleted by proper compression processing performed at the time of distribution, and also embedded in a form that it may be deleted when the digital audio signal with a watermark is compressed by other types of compression processing such as MP3. More concretely, compression characteristic of the proper compression processing used at the time of distribution and that of other types of compression processing are compared. The proper compression processing used at the time of distribution does not delete the fragile watermark DC2. The other types of compression processing embeds the fragile watermark DC2 into signals that are deleted by quantization processing for the digital audio signal, based on the above-mentioned threshold of audibility and masking threshold at the time of compression processing.

Furthermore, in the above embodiment, such a case has been described that the robust watermark DC1 and the fragile watermark DC2 are embedded in the digital audio signal; however, we do not intend to limit the present invention to such. The robust watermark DC1 is embedded in the digital audio signal, and after the compression processing of the signal, the fragile watermark DC2 may be embedded in a compressed stream signal. As a result, it is possible to easily set the deletion level of the fragile watermark DC2 by compression processing to the minimum, regardless of the characteristic of the Codec.

Moreover, in the above embodiment, such a case has been described that the fragile watermark DC2 is embedded in the digital audio signal at the position and level to be completely deleted after compression processing such as MP3; however, we do not intend to limit the present invention to such. The fragile watermark DC2 may not be completely deleted even after the compression processing such as MP3.

The detection division determines whether or not the detected level of the fragile watermark DC2 is lower than a predetermined threshold. If the level is below the threshold, it may be set to determine that the digital audio signal to be detected has been illegally copied. If beyond the threshold, it may be set to determine that the digital audio signal to be detected has been properly copied. After all, the fragile watermark DC2 may be embedded in the digital audio signal in any composition, as long as the detection division can detect the fact that the compression processing has been performed according to how low the survival rate of the fragile watermark DC2 has become after the digital audio signal embedded with the robust watermark DC1 and the fragile watermark DC2 is compressed such as by MP3.

Besides, in the above embodiment, such a case has been described that the robust watermark DC1 and the fragile watermark DC2 are embedded in the digital audio signal, using the psychological auditory sense model that is the compression characteristics of the MP3; however, we do not intend to limit the present invention to such. The present invention can be widely applied to such cases that psychological auditory sense models based on a wide variety of compression standards such as MPEG-AAC, ATRAC, ATRAC2, ATRAC3, Dolby AC3, MS (Microsoft) Audio, Twin VQ, or combinations of these psychological auditory sense models are used. If do it like this, it is possible to realize a general-use fragile watermark that suits much compression standards.

Besides, in the above embodiment, such a configuration has been described that the robust watermark encoding division has been integrated with the fragile watermark encoding division in the watermark encoder 1; however, we do not intend to limit the present invention to such. For instance, the present invention is able to use such a configuration that the robust watermark encoding division is connected in series with the fragile watermark encoding division, or such a configuration that the robust watermark encoding division is connected in a parallel arrangement with the fragile watermark encoding division.

Besides, in the above embodiment, such a configuration has been described that the robust watermark decoding division has been integrated with the fragile watermark decoding division in the watermark decoder 6; however, we do not intend to limit the present invention to such. For instance, the present invention is able to use such a configuration that the robust watermark decoding division is connected in series with the fragile watermark decoding division, or such a configuration that the robust watermark decoding division is connected in a parallel arrangement with the fragile watermark decoding division.

Besides, in the above embodiment, such a case has been described that the copyright information and the compression history information is superimposed on the digital audio signal; however, we do not intend to limit the present invention to such. The present invention may be applied to the cases where the various information is superimposed on, as necessary, and transferred.

Besides, in the above embodiment, such a case has been described that the embedding process of the watermark is performed by the watermark encoder 1; however, we do not intend to limit the present invention to such. Alternatively, from a program storing medium (a floppy disk, an optical disk and so on) in which a program for realizing the respective functions of the water mark encoder 1 has been stored, the program may be loaded in an information processing device (computer), and the respective functions may be executed.

Figure 12:
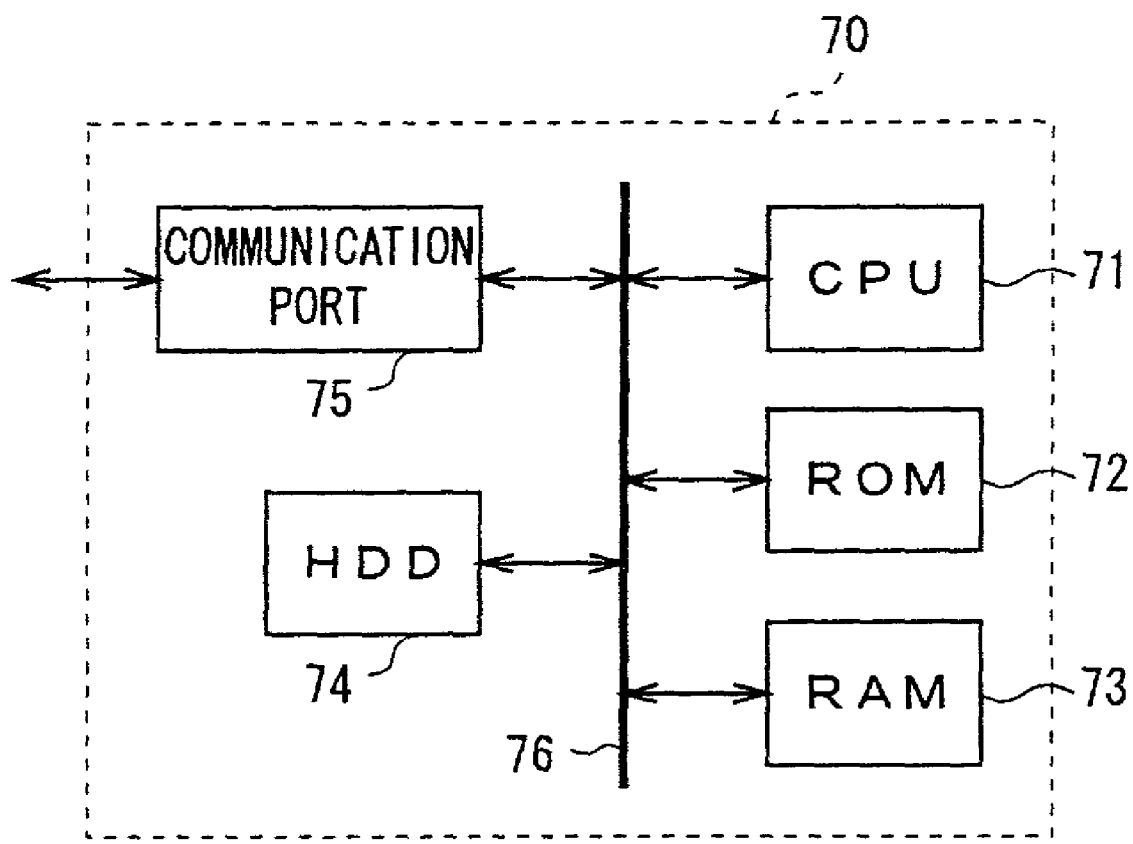
FIG. 12 is a block diagram illustrating an internal configuration of a computer.

For example, an ordinary computer 70 as shown in FIG. 12 comprises a CPU (Central Processing Unit) 71 in charge of an entire operation, a ROM (Read Only Memory) 72 storing various kinds of software, a RAM (Random Access Memory) 73 as a work memory for the CPU 71, a hard disk drive 74 storing various data, and a communication port 75 which is an interface for communicating with the externals via a network. These are interconnected though a bus 76 to make a configuration.

The hard disk drive 74 or the ROM 72 stores programs to perform each function mentioned above in the computer 70. At the time of execution, the CPU 71 may activate each corresponding function part according to the work memory stored in the RAM 73. Also, the computer 70 may install programs for activating each function mentioned above via the communication port 75.

INDUSTRIAL APPLICABILITY

This invention is directed to a signal processing device and its method as well as a program storing medium, and applicable to the safeguarding of the copyright of music data and so on.

The invention claimed is:

1. A signal processing device for superimposing digital watermarking information on an audio signal, said device comprising:
psychological auditory sense analysis means for performing psychological auditory sense analysis based on a predetermined compression characteristic of said audio signal, and for outputting the result of the analysis as psychological auditory sense encoded information; and
superimposing means for superimposing on said audio signal first digital watermarking information and second digital watermarking information to create a marked audio signal, said first digital watermarking information and said second digital watermarking information being based on said psychological auditory sense encoded information and on at least one range of amplitudes within which a frequency representation of said audio signal is sampled during compression processing such that regions containing first digital watermarking information are sampled during compression processing and regions containing said second digital watermarking information are not sampled during compression processing, and being characterized in that, upon further compression of said marked signal to create a compressed signal, said first digital watermarking information can be completely or substantially recovered from said compressed signal and said second digital watermarking information cannot be completely or substantially recovered from said compressed signal;
wherein said psychological auditory sense encoded information is indicative of the respective frequency bands of said audio signal on which said first and second digital watermarking information are to be superimposed, and the respective levels to which the first and second digital watermarking information should be set prior to superimposition.

2. The signal processing device according to claim 1, wherein said psychological auditory sense analysis means generates said psychological auditory sense encoded information based on a predetermined minimum level of audio signal that can be detected by the auditory sense of a human being.

3. The signal processing device according to claim 1, wherein said psychological auditory sense analysis means generates said psychological auditory sense encoded information, on the basis of a masking effect of the audio signal.

4. The signal processing device according to claim 1, wherein said digital watermarking information includes copyright information relevant to said audio signal.

5. A signal processing method of superimposing digital watermarking information on an audio signal, said method, comprising the steps of:
performing psychological auditory sense analysis based on a predetermined compression characteristic of said audio signal, and then outputting the result of the analysis as psychological auditory sense encoded information; and
superimposing on said audio signal first digital watermarking information and second digital watermarking information to create a marked audio signal, said first digital watermarking information and said second digital watermarking information being based on said psychological auditory sense encoded information and on at least one range of amplitudes within which a frequency representation of said audio signal is sampled during compression processing such that regions containing first digital watermarking information are sampled during compression processing and regions containing said second digital watermarking information are not sampled during compression processing, and being characterized in that, upon further compression of said marked signal to create a compressed signal, said first digital watermarking information can be completely or substantially recovered from said compressed signal and said second digital watermarking information cannot be completely or substantially recovered from said compressed signal;
wherein said psychological auditory sense encoded information is indicative of the respective frequency bands of said audio signal on which said first and second digital watermarking information are to be superimposed, and the respective levels to which the first and second digital watermarking information should be set prior to superimposition.

6. The signal processing method according to claim 5, wherein at said step of performing psychological auditory sense analysis, said psychological auditory sense encoded information is generated based on a predetermined minimum level of audio signal that can be detected by the auditory sense of a human being.

7. The signal processing method according to claim 5, wherein at said step of performing psychological auditory sense analysis, said psychological auditory sense encoded information is generated, on the basis of a masking effect of the audio signal.

8. The signal processing method according to claim 5, wherein said digital watermarking information includes copyright information relevant to said audio signal.

9. A storage medium comprising program code for directing a signal processing device to perform the steps of:
performing psychological auditory sense analysis based on a predetermined compression characteristic of an audio signal and then outputting the result of the analysis as psychological auditory sense encoded information; and
superimposing on said audio signal first digital watermarking information and second digital watermarking information to create a marked audio signal, said first digital watermarking information and said second digital watermarking information being based on said psychological auditory sense encoded information and on at least one range of amplitudes within which a frequency representation of said audio signal is sampled during compression processing such that regions containing first digital watermarking information are sampled during compression processing and regions containing said second digital watermarking information are not sampled during compression processing, and being characterized in that, upon further compression of said marked signal to create a compressed signal, said first digital watermarking information can be completely or substantially recovered from said compressed signal and said second digital watermarking information cannot be completely or substantially recovered from said compressed signal;
wherein said psychological auditory sense encoded information is indicative of the respective frequency bands of said audio signal on which said first and second digital watermarking information are to be superimposed, and the respective levels to which the first and second digital watermarking information should be set prior to superimposition.

10. The program storing medium according to claim 9, wherein at said step of performing psychological auditory sense analysis, said psychological auditory sense encoded information is generated based on a predetermined minimum level of audio signal that can be detected by the auditory sense of a human being.

11. The program storing medium according to claim 9, wherein at said step of performing psychological auditory sense analysis, said psychological auditory sense encoded information is generated, on the basis of a masking effect of the audio signal.

12. The program storing medium according to claim 9, wherein said digital watermarking information includes copyright information relevant to said audio signal.

\* \* \* \* \*